United States Patent
Szegeny et al.

(10) Patent No.: US 12,449,028 B2
(45) Date of Patent: Oct. 21, 2025

(54) ELECTROMOTIVE DRIVE FOR MOTOR VEHICLE APPLICATIONS

(71) Applicant: KIEKERT AKTIENGESELLSCHAFT, Heiligenhaus (DE)

(72) Inventors: Peter Szegeny, Engelskirchen (DE); Ömer Inan, Dorsten (DE); Holger Schiffer, Meerbusch (DE); Michael Scholz, Essen (DE); Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 150 days.

(21) Appl. No.: 18/546,858

(22) PCT Filed: Jan. 13, 2022

(86) PCT No.: PCT/DE2022/100021
§ 371 (c)(1),
(2) Date: Aug. 17, 2023

(87) PCT Pub. No.: WO2022/167027
PCT Pub. Date: Aug. 11, 2022

(65) Prior Publication Data
US 2024/0418248 A1 Dec. 19, 2024

(30) Foreign Application Priority Data
Feb. 4, 2021 (DE) ...................... 10 2021 102 559.1

(51) Int. Cl.
*F16H 1/16* (2006.01)
*E05B 81/06* (2014.01)
(Continued)

(52) U.S. Cl.
CPC .......... *F16H 37/124* (2013.01); *E05B 81/06* (2013.01); *E05B 81/30* (2013.01); *E05B 81/34* (2013.01); *E05B 81/42* (2013.01)

(58) Field of Classification Search
CPC .................................. E05B 81/06; F16H 1/16
See application file for complete search history.

(56) References Cited

U.S. PATENT DOCUMENTS

| | | | |
|---|---|---|---|
| 4,876,794 A | 10/1989 | Myers | |
| 6,208,103 B1 * | 3/2001 | Kachouh | E05B 81/16 70/192 |
| 6,773,042 B2 | 8/2004 | Spurr | |

FOREIGN PATENT DOCUMENTS

| | | |
|---|---|---|
| DE | 3319354 A1 | 12/1983 |
| DE | 4439479 A1 | 5/1996 |

(Continued)

OTHER PUBLICATIONS

International Search Report mailed Mar. 15, 2022, for priority International Application No. PCT/DE2022/100021.

*Primary Examiner* — Randell J Krug
(74) *Attorney, Agent, or Firm* — Renner, Otto, Boisselle & Sklar, LLP

(57) ABSTRACT

An electromotive drive for motor vehicle applications, which is equipped with an electric motor, a drive wheel that interacts with the electric motor, in particular a worm wheel having a cam contour, and a lever that can be impacted by the cam contour. The cam contour completes a full rotation in order to impact the lever. According to the invention, the cam contour is designed to exceed a full rotation.

15 Claims, 2 Drawing Sheets

(51) Int. Cl.
*E05B 81/30* (2014.01)
*E05B 81/34* (2014.01)
*E05B 81/42* (2014.01)
*F16H 37/12* (2006.01)

(56) References Cited

FOREIGN PATENT DOCUMENTS

| | | |
|---|---|---|
| DE | 19702420 C5 | 7/1998 |
| DE | 19832170 C1 | 2/2000 |
| DE | 19948052 A1 | 4/2001 |
| DE | 10361168 A1 | 7/2005 |
| DE | 10208722 B4 | 8/2009 |
| EP | 0967350 A1 | 12/1999 |
| EP | 1074681 A1 | 2/2001 |
| EP | 3099872 B1 | 12/2016 |
| JP | 2002180721 A | 6/2002 |

\* cited by examiner

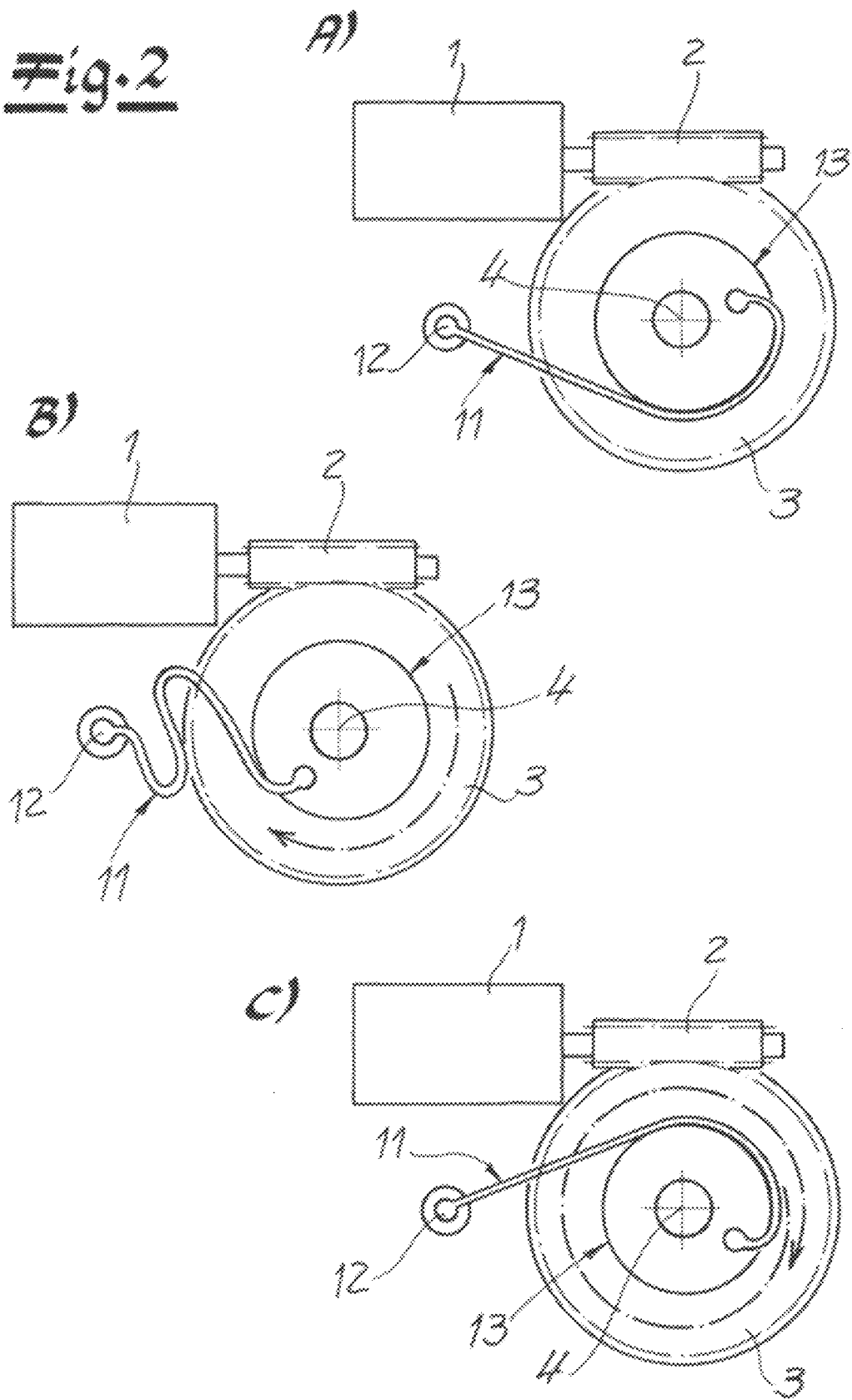

ELECTROMOTIVE DRIVE FOR MOTOR VEHICLE APPLICATIONS

This application is a national phase of International Application No. PCT/DE2022/100021 filed Jan. 13, 2022, which claims priority to German Patent Application No. 10 2021 102 559.0 filed Feb. 4, 2021, each of which is hereby incorporated herein by reference in its entirety.

FIELD OF DISCLOSURE

The invention relates to an electric motor drive for motor vehicle applications, having an electric motor, further having a drive wheel, in particular a worm wheel, interacting with the electric motor and having a cam contour, and having a lever which can be acted upon by the cam contour, wherein the cam contour completes a full revolution (360°) in order to act upon the lever.

BACKGROUND OF DISCLOSURE

Electric motor drives for motor vehicle applications are characterized by a robust design and the possibility of operation with a low voltage of typically 12 V or 24 V DC. As a result, special measures are often required for the transmission of the rotary movement of the electric motor in order to realize power-consuming actuations. Such ratios are usually provided by the electric motor meshing with a worm located on its output shaft with external teeth of the worm wheel. In addition, the cam contour typically has a spiral edge in order to be able to apply increasing torque to the lever that rests against it and can be acted upon with the aid of the spiral edge of the cam contour.

This has proved fundamentally successful, which is why such electromotive drives are used, for example, to control a shutter, as described in the generic DE 197 02 420 C5. In fact, the adjusting element or the actuator realized in this way can realize the functional positions "open", "locked", "anti-theft" and finally "child safety", which correspond to rotary movements of the worm wheel of 0° or 360°, 90°, 180° and finally 270°. This has proven itself in principle.

In addition, comparable electromotive drives have recently also been used in connection with the actuation of locking actuators in charging devices in connection with electric or hybrid motor vehicles. Other use cases of such electromotive drives can be to provide for a raising and lowering movement of a window pane, a mirror adjustment or even a seat adjustment. It can also be used for lid unlocking/locking. In addition, such electric motor drives are used inside motor vehicle locks or as pull/open drives. These drives are always characterized by a high-speed electric motor whose high number of revolutions is converted into a relatively slow movement with, in contrast, increased force or increased torque and, consequently, a large transmission ratio.

It is true that intermediate gearboxes can be provided in this context. However, these increase the technological effort and friction, and are consequently usually avoided and not considered to be goal-oriented. Nevertheless, there are still and unchanged efforts to increase the translation already provided. There are currently no constructively simple and cost-effective solutions available for this. The invention as a whole seeks to remedy this.

SUMMARY OF DISCLOSURE

The invention is based on the technical problem of further developing such an electric motor drive for motor vehicle applications in such a way that an increase in the transmission ratio is made available while at the same time the design is simple and cost-effective.

To solve this technical problem, the invention proposes, in a generic electric motor drive for motor vehicle technical applications, that the cam contour is configured to realize more than a full rotation (>360°).

To prevent any collisions with a stationary stop in this context, the cam contour is typically equipped with a flexible stop. The stop is usually a clamping means interacting with the drive wheel, particularly the worm wheel. Advantageously, the drive wheel is designed as a worm wheel. It is also conceivable that the drive gear is designed as a toothed wheel or similar.

The invention is based first of all on the knowledge that the realization of more than a full revolution on the part of the cam contour can be used or employed in such a way that, with the aid of the cam contour, a transmission ratio which is even higher than that of the prior art can be transmitted to the lever. As a result, the lever is able to perform the desired positioning movements with an increased torque compared to the prior art. This can involve the representation of functional states inside a motor vehicle latch, a closing or opening movement on a motor vehicle door latch, the raising or lowering of a motor vehicle window, etc., to name just a few application examples.

The flexible stop is implemented so that the electromotive drive is nevertheless decelerated and can be stopped after completion of an associated positioning movement. This means that any "overrun" movements of the drive are not observed. This is because with the help of such a flexible stop, the desired rotations of more than 360° of the cam contour can easily be put into practice, without having to fear any collisions with a stationary stop. Rather, the stop, which is advantageously designed as a clamping means interacting with the drive wheel, in particular the worm wheel, represents a proven means of being able to decelerate the cam contour and thus the drive wheel, in particular the worm wheel, at the end of its positioning movement or also at the beginning after a reversing movement. Due to the flexibility of the clamping means, this braking process can also be regarded as "soft" compared to a "hard stop", so that such a design is associated with the additional advantage that any damage to the electromotive drive caused by a hard stop is avoided.

According to an advantageous design, the clamping means is fixed on the one hand to the drive wheel, particularly the worm wheel, and on the other hand to a stationary stop. In addition, the drive wheel, particularly the worm wheel, advantageously has a guide contour for the clamping means. The guide contour can therefore be used to "wind" the clamping device onto the drive wheel, particularly the worm wheel. To prevent collisions with the cam contour at this location, the design is also such that the guide contour is provided and arranged opposite the cam contour on the drive wheel, particularly the worm wheel.

I.e., the cam contour and the lever that rests against it and interacts with it to apply the desired adjusting element are located on one side of the drive wheel, particularly the worm wheel, for example on its upper side or front side. In contrast, the rear side of the drive wheel, particularly the worm wheel, is typically equipped with the guide contour. Since the clamping means is connected to the drive wheel, in particular to the worm wheel, with one end, usually adjacent to the guide contour or even on the guide contour, a rotary movement of the drive wheel, in particular worm wheel, causes the clamping means to contact the worm wheel around the guide contour and thereby to be wound up, as it were, on the drive wheel, in particular worm wheel.

In this context, it has proved particularly favorable if the clamping device is designed in the form of a band. In principle, the clamping means can also be a spring, for example a spiral spring. However, the invention usually resorts to a band-shaped tensioning means which, in addition and typically, allows a flexible length change of more than 20%, preferably of more than 50%. This means that the length of the band-shaped tensioning means can be extended or stretched by more than 20%, by more than 50% or by even more without any damage being observed at this location.

For this purpose, the clamping means is advantageously made entirely or partially of an elastic material. Here, for example, elastic plastics such as elastomers have proven to be particularly favorable. In principle, the clamping device can also be made of a textile. In addition, combinations of an elastomer with a textile, for example, are undoubtedly also conceivable.

The cam contour usually has a recess for the lever, preferably close to the axis. That is, the recess is found close or adjacent to the axis of the drive wheel, particularly the worm wheel. A spiral edge or spiral contour of the cam contour generally emanates from this recess. The spiral edge or spiral contour describes more than one full revolution around the previously mentioned axis of the drive wheel, particularly the worm wheel.

If the cam contour is arranged in a plane, the cam contour has the mentioned spiral edge in said plane, which works with increasing radial distance on the lever to act on the adjusting element. In principle, however, a spiral contour can also be realized at this location, which has a helical extension in comparison to the axis of the drive wheel/worm wheel and in this way describes the more than full rotation around the axis. The helical shape of the spiral contour implies that the spiral contour, and with it the cam contour as a whole, has a spatial or three-dimensional design. In such a case, the helical spiral contour again ensures that the lever interacting therewith is acted upon by the spiral contour to initiate the desired movement of the adjusting element.

As a result, an electric motor drive for motor vehicle applications is provided which, due to the possibility of its cam contour to realize more than a full revolution, is able to transmit a particularly high transmission ratio starting from the electric motor via the drive wheel, particularly worm wheel, and the cam contour to the lever for acting on the desired adjusting element. For example, the lever may be connected directly or indirectly to a rotary latch in order to actuate the latch in the sense of a closing movement and thus close an associated motor vehicle door. Of course, other applications are also conceivable, which have already been described in the introduction.

Thus, an additional subject matter of the invention is a motor vehicle latch and, in particular, a motor vehicle door lock, which is equipped with such an electromotive drive. The actuator can be used to open the motor vehicle lock in question electrically. This is achieved indirectly by actuating a release lever or directly by applying pressure directly to the pawl. In addition, lock functions such as a child safety lock, an anti-theft device, a central locking system, etc. can be inserted and implemented individually or in combination with the help of the relevant drive.

The drive wheel, in particular the worm wheel, is usually designed as an injection molded part, so that the drive wheel, in particular the worm wheel, including the cam contour can be produced particularly easily and cost-effectively. Designs made of metal or plastic have proven and tested themselves here. In connection with the flexible stop designed as a band-shaped clamping device, a particularly simple design is provided and converted, which also entails only low manufacturing costs. Herein lie the essential advantages.

BRIEF DESCRIPTION OF DRAWINGS

The invention is explained in greater detail below with reference to a drawing which shows only one exemplary embodiment. In the drawing:

FIGS. 2A to 2C show a rear view of the electric motor drive according to FIGS. 1A and 1B.

DETAILED DESCRIPTION

Figure 1B:
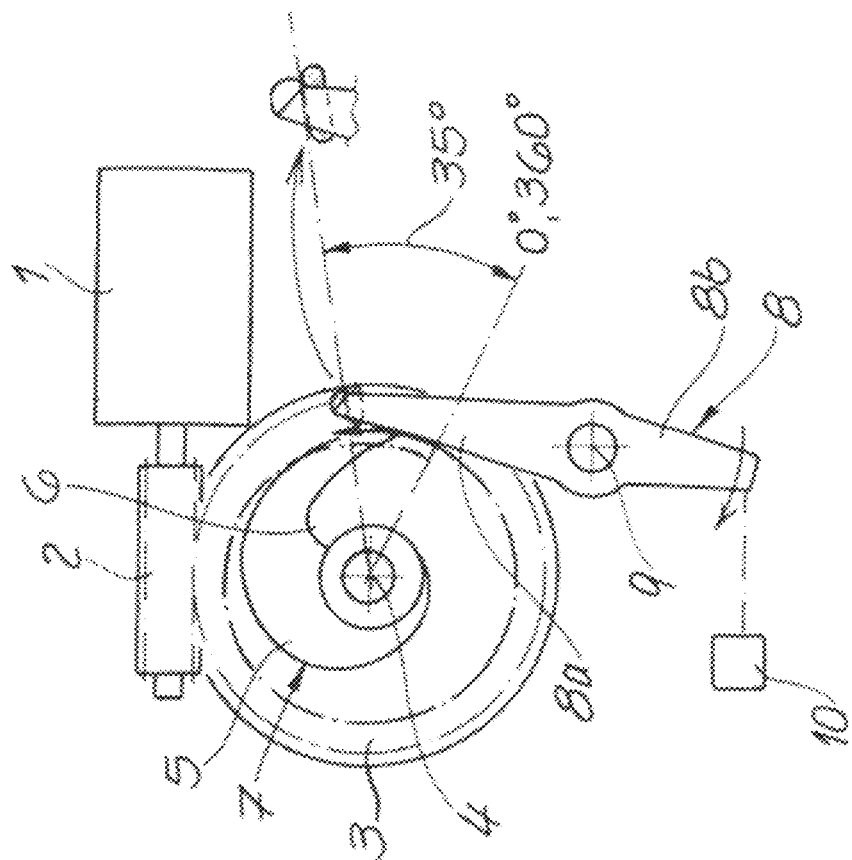
FIGS. 1A and 1B show a front view of the electromotive drive according to the invention in two different functional positions.
Figure 1A:
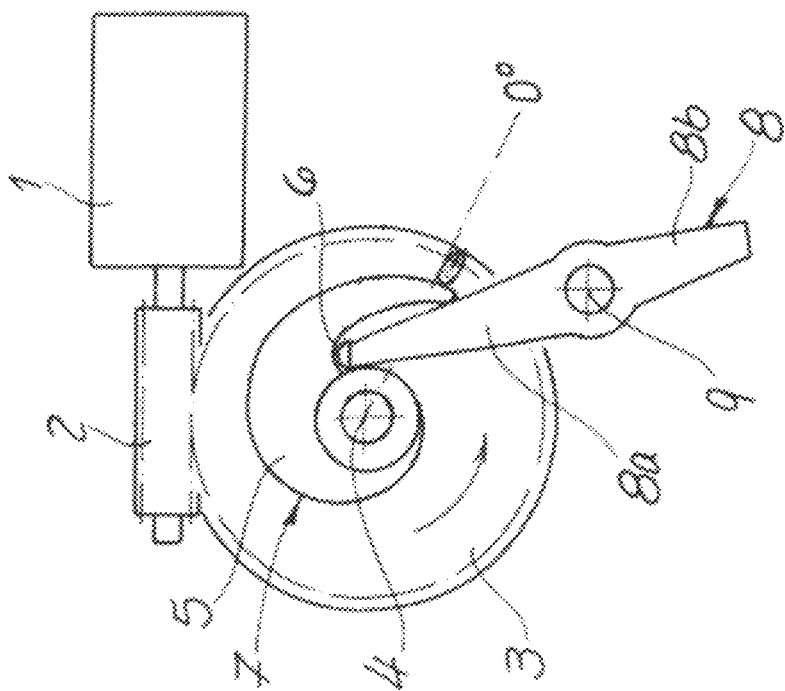

In the figures, an electric motor drive for motor vehicle applications is represented. For this purpose, the drive in question has an electric motor 1 which is consequently and typically operated with a low DC voltage of, for example, 12 V, 24 V or 48 V. The electric motor 1 has an output worm 2 arranged on its output shaft, which meshes with external teeth of a worm wheel 3. This allows the worm wheel 3 to perform counterclockwise movements about its axis 4, in particular as shown in FIGS. 1A and 1B. The counterclockwise movement in the front view shown in FIGS. 1A and 1B corresponds to a clockwise movement in the rear view shown in FIGS. 2A to 2C. In principle, clockwise movements in the front view and corresponding counterclockwise movements in the rear view are of course also conceivable.

The worm wheel 3 is equipped with a spiral cam contour 5. The cam contour 5 has a recess 6 near the axis on the one hand and a spiral edge 7 on the other. The spiral edge 7 starts from the recess 6 and is characterized by an increasing radius in the actuation direction (counterclockwise in the front view according to FIGS. 1A and 1B), so that a lever 8 acted upon with the aid of the cam contour 5 experiences an increasing torque application. In fact, the lever 8 is a two-arm lever made of, for example, plastic or metal, which is rotatably mounted in a housing about an axis 9 that is central according to the embodiment example. The housing may be a housing of a motor vehicle lock or a pull drive, window regulator drive, flap drive, etc.

According to the embodiment, the lever 8 is used to actuate an adjusting element 10. In the case of a pull drive, the adjusting element 10 can be a rotary latch, not expressly shown, of the motor vehicle door latch already mentioned. In principle, however, the adjusting element 10 can also be a window pane which can be raised and lowered, a motor vehicle door, a motor vehicle flap, etc. For this purpose, the lever 8 is capable of performing the actuating movement indicated in FIG. 1B, which, according to the embodiment example, corresponds to the lever 8 being pivoted clockwise about its axis 9 starting from its initial position in FIG. 1A, as can be understood by comparing FIGS. 1A and 1B.

The special feature according to the invention is that the cam contour 5 for acting on the lever 8 can not only perform a movement in the sense of a full rotation through 360°, as can be understood by comparing FIGS. 1A and 1B. In fact, in FIG. 1A the initial position of the cam contour 5 corresponding to 0° is represented, whereas in FIG. 1B the final position of the cam contour 5 is reproduced, corresponding to an angle greater than 360°. In fact, in the example case shown, an angle of almost 400° in total is completed, namely 360° plus approx. 35°. Of course, this applies only by way of example and is in no way restrictive.

That is, according to the invention, the cam contour 5 is configured to realize more than a full rotation of more than 360° about the associated axis 4 of the worm wheel 3. To realize and convert this in detail, the two-armed lever 8 dips with its one arm 8a into the previously mentioned recess 6 of the cam contour 5. The other arm 8b of the two-armed lever 8, on the other hand, acts on the merely indicated adjusting element 10, either directly or indirectly, as desired. The adjusting element 10 can be the rotary latch, window pane, motor vehicle door, etc. mentioned earlier.

Starting from the basic position according to FIG. 1A and the setting angle of 0° for the cam contour 5, a rotary movement of the worm wheel 3 and thus of the cam contour 5 about the axis 4 in counterclockwise direction now causes the spiral edge 7 of the cam contour 5 to move against the arm 8a of the lever 8. In the example case shown, the cam contour 5 and thus the spiral edge 7 extend in a plane parallel to the worm wheel 3. Due to the increasing distance of the spiral edge 7 from the axis 4 of the worm wheel 3, the arm 8a of the lever 8 is increasingly pivoted about the axis 9, namely in a clockwise direction, and thus the adjusting element 10 experiences the desired loading.

As a result of the fact that the cam contour 5 completes more than a full rotation of over 360° during this process, the total transmission ratio provided by the electric motor 1 can be increased, with which the lever 8 is ultimately acted upon. In order to nevertheless be able to decelerate and stop the electric motor 1 precisely at the end of this movement, a flexible stop 11 is additionally implemented, which can be understood from the rear view according to FIGS. 2A to 2C.

In fact, the stop 11 is designed as a clamping means 11 interacting with the worm wheel 3. For this purpose, the clamping means 11 is fixed to the worm wheel 3 on the one hand and to a stationary stop 12 on the other hand. The worm wheel 3 also has a guide contour 13 for the clamping means 11. In the exemplary embodiment, the guide contour 13 is a ring or annular contour that surrounds the axis 4 of the worm wheel 3 at a distance. It can be seen that one end of the clamping means 11 is fixed to the guide contour 13 or engages in the guide contour 13, whereas the other end of the clamping means 11 is connected to the stationary stop 12.

In this regard, the overall and further still design is such that the cam contour 5 is arranged and placed on the front side or upper side of the worm wheel 3, which is viewed when looking at FIGS. 1A and 1B. In contrast, the guide contour 13 is found on the rear side of the worm wheel 3, as can be seen from the rear view according to FIGS. 2A to 2C. The cam contour 5 and the guide contour 13 are manufactured as a whole in one piece with the worm wheel 3 as an injection-molded part, for example. This can be made of plastic and/or metal.

FIGS. 2A to 2C then make it even clearer that the clamping means 11 is designed in the form of a band. In addition, the band-shaped tensioning means 11 allows a flexible length change of more than 20%, preferably of 50% or more. This means that when the band-shaped tensioning means 11 is subjected to an axial load, it is able to increase its length by more than 20% and preferably even by 50% or more and can nevertheless return to its original state flexibly and without damage after the axial load has ended. For this purpose, the clamping means 11 is made entirely or partially of an elastic material. This can be an elastomeric plastic, for example NR (natural rubber). In principle, a textile or combinations are also conceivable at this location.

In any case, the loading of the lever 8 by means of the cam contour 5 moving in a counterclockwise direction as shown in the front view in FIGS. 1A and 1B results in the corresponding clockwise movement of the worm wheel 3 being reproduced in the rear view according to FIGS. 2A to 2C. The clockwise movement now corresponds to the fact that the clamping means 11 is placed against the circumference of the annular guide contour 13 and is wound up on the guide contour 13, as can be seen in the sequence of FIGS. 2A to 2C. This also applies in principle when the worm wheel 3 completes a reversing movement in the counterclockwise direction.

Not represented is the further possibility that the cam contour 5 does not have an in-plane oriented spiral edge 7, but instead is equipped with a helically extending spiral contour. In this case, the arm 8a of the lever 8 equipped with the cam contour 5 can be equipped, for example, with a roller that follows the helical spiral contour of the cam contour 5. In this case, the two-armed lever 8 does not complete a pivoting movement about its axis 9, but rather is moved upward about an axis lying in the drawing plane, so that as a result the other arm 8b completes a downward movement, which in turn can be transmitted to the adjusting element 10.

| LIST OF REFERENCE SIGNS | |
|---|---|
| 1 | Electric motor |
| 2 | Output worm |
| 3 | Drive wheel/worm wheel |
| 4 | Axis |
| 5 | Cam contour |
| 6 | Recess (close to the axis) |
| 7 | Spiral edge |
| 8 | Two-armed lever |
| 8a | First Arm |
| 8b | Second Arm |
| 9 | (middle) axis |
| 10 | Adjusting element |
| 11 | Flexible stop/clamping means |
| 12 | Stop (stationary) |
| 13 | Guide contour |

The invention claimed is:

1. An electric motor drive for motor vehicle applications, the electric motor drive comprising:
   an electric motor,
   a drive wheel interacting with the electric motor, wherein the drive wheel includes a cam contour and a guide contour,
   a lever which is acted upon by the cam contour, wherein the cam contour completes at least a full rotation about an axis of the drive wheel in order to act upon the lever, wherein the cam contour is configured to rotate more than the full rotation about the axis of the drive wheel, and
   a flexible stop connected to the guide contour, wherein the flexible stop changes in length as the cam contour rotates.

2. The electric motor drive according to claim 1, wherein the guide contour is provided opposite the cam contour on the drive wheel.

3. A motor vehicle latch comprising an electric motor drive according to claim 1 and an adjusting element that is operated by the lever of the electric motor drive.

4. The electric motor drive according to claim 1, wherein the drive wheel is a worm wheel or a toothed wheel.

5. The electric motor drive according to claim 1, wherein the guide contour is an annular contour that surrounds and is spaced apart from the axis of the drive wheel.

6. The electric motor drive according to claim 1, wherein the cam contour is arranged on a first side of the drive wheel and the guide contour is arranged on a second side of the drive wheel opposite from the first side.

7. The electric motor drive according to claim 1, wherein the cam contour has a recess that receives the lever and that is positioned adjacent to the axis of the drive wheel.

8. The electric motor drive according to claim 7, wherein the cam contour has a spiral edge that circumscribes more than one full revolution about the axis of the drive wheel.

9. The electric motor drive according to claim 1, wherein the flexible stop is a clamp.

10. The electric motor drive according to claim 9, wherein the clamp is fixed on one end to the guide contour of the drive wheel and on another end to a stationary stop.

11. The electric motor drive according to claim 9, wherein the clamp is configured as a spiral spring.

12. The electric motor drive according to claim 9, wherein the clamp is configured as a tensioner, comprising a band that allows a flexible length change of more than 20%.

13. The electric motor drive according to claim 12, wherein the band allows a flexible length change of more than 50%.

14. The electric motor drive according to claim 12, wherein the tensioner is made entirely or partly of an elastic material.

15. The electric motor drive according to claim 14, wherein the tensioner includes an elastomer, a textile, or a combination thereof.

\* \* \* \* \*